United States Patent
Zhang et al.

(10) Patent No.: US 10,866,599 B2
(45) Date of Patent: Dec. 15, 2020

(54) SMART WATER DISPENSER AND CONTROL METHOD THEREOF

(71) Applicant: BOE Technology Group Co., Ltd., Beijing (CN)

(72) Inventors: Zhongwei Zhang, Beijing (CN); Ken Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 16/007,558

(22) Filed: Jun. 13, 2018

(65) Prior Publication Data

US 2019/0086940 A1   Mar. 21, 2019

(30) Foreign Application Priority Data

Sep. 20, 2017   (CN) ........................... 2017 1 0852608

(51) Int. Cl.
| | | |
|---|---|---|
| *G05D 9/00* | (2006.01) | |
| *G05D 9/12* | (2006.01) | |
| *B67D 7/02* | (2010.01) | |
| *B65B 3/06* | (2006.01) | |

(52) U.S. Cl.
CPC ................. *G05D 9/00* (2013.01); *B65B 3/06* (2013.01); *B67D 7/02* (2013.01); *G05D 9/12* (2013.01)

(58) Field of Classification Search
CPC .................................... G05D 9/00; G05D 9/12
USPC .................................................. 141/198, 206
See application file for complete search history.

(56) References Cited

U.S. PATENT DOCUMENTS

| | | | | |
|---|---|---|---|---|
| 4,440,200 A | * | 4/1984 | DeVale | ................. G01F 13/006 |
| | | | | 141/198 |
| 9,004,115 B2 | * | 4/2015 | Krause | ................. B67D 1/0888 |
| | | | | 141/198 |
| 2016/0095462 A1 | | 4/2016 | Bikerman et al. | |

FOREIGN PATENT DOCUMENTS

| | | |
|---|---|---|
| CN | 202112905 U | 1/2012 |
| CN | 103948313 A | 7/2014 |
| CN | 104181902 A | 12/2014 |
| CN | 104720596 A | 6/2015 |
| CN | 105030063 A | 11/2015 |
| CN | 204813418 U | 12/2015 |
| CN | 105635781 A | 6/2016 |
| CN | 107065662 A | 8/2017 |
| CN | 107157333 A | 9/2017 |
| JP | 2013-190882 A | 9/2013 |

OTHER PUBLICATIONS

Original and Translation of CN 103948313; Lin Xiaoyu; Jul. 30, 2014.*

(Continued)

*Primary Examiner* — Paul J Gray
(74) *Attorney, Agent, or Firm* — McDermott Will & Emery LLP

(57) ABSTRACT

The present disclosure discloses a smart water dispenser and a control method thereof. The smart water dispenser includes: an electronically controlled switch for starting adding water to a cup when it is turned on and stopping adding water when it is turned off; a cup detection module for detecting a cup placed under an outlet of the smart water dispenser; and a water level detection module for detecting a water level of water in the cup when the water is being added to the cup under the outlet.

6 Claims, 3 Drawing Sheets

(56) References Cited

OTHER PUBLICATIONS

Original and Translation of CN 107065662; Yang Zhenhai; Aug. 18, 2017.*
First Office Action issued in Chinese Patent Application No. 201710852608.0, dated Mar. 4, 2019; with English translation.

* cited by examiner

SMART WATER DISPENSER AND CONTROL METHOD THEREOF

CROSS-REFERENCE TO RELATED APPLICATION

This application claims priority to Chinese Application No. 201710852608.0, entitled "SMART WATER DISPENSER AND CONTROL METHOD THEREOF" and filed on Sep. 20, 2017, which is incorporated herein by reference in its entirety.

TECHNICAL FIELD

The present disclosure relates to, but is not limited to, the field of automatic equipment technology, and in particular, to a smart water dispenser and a control method thereof.

BACKGROUND

The present disclosure relates to, but is not limited to, the field of automatic equipment technology, and in particular, to a smart water dispenser and a control method thereof.

SUMMARY

The present disclosure provides a smart water dispenser, including: an electronically controlled switch for starting adding water to a cup when it is turned on, and stopping adding water when it is turned off; a cup detection module for detecting a cup placed under an outlet of the smart water dispenser; and a water level detection module for detecting a water level of water in the cup when the electronically controlled switch is turned on to add water to the cup in response to that the cup detection module detects the cup.

Alternatively, the water level detection module includes a laser range finder arranged at the outlet.

Alternatively, the water level detection module includes a water level monitoring sensor and a wireless communication device arranged on the cup, and wherein the water level monitoring sensor is electrically connected to a master control system through the wireless communication device, and is configured to transmit information on the water level of water in the cup detected by the water level monitoring sensor to the master control system through the wireless communication device.

Alternatively, the smart water dispenser further includes a command receiver for receiving and storing user commands and determining priorities of the user commands to be executed; a moving module for moving the smart water dispenser; a positioning and navigation module for determining a target location and a planned target route according to the user command, and controlling the moving module to move the smart water dispenser to a target location according to the planned target route; a flow detection module for calculating a water discharged volume of the outlet, and issuing to the master control system an instruction of turning off the electronically controlled switch if the water discharged volume reaches a predetermined value; and the master control system electronically connected to the command receiver, the moving module, the positioning and navigation module, the electronically controlled switch, the cup detection module, the water level detection module, the water volume monitoring module, the power monitoring module and the flow detection module, for controlling the positioning and navigation module, the moving module, the electronically controlled switch, the cup detection module, the water level detection module and the flow detection module according to the user command.

Alternatively, the smart water dispenser further includes: a water volume detection module, for detecting a volume of water stored in a tank, and issuing to the master control system an instruction of prompting a user to add water to the tank if the volume of water is lower than a first preset value; a power monitoring module, for monitoring a remaining power of the smart water dispenser, and issuing to the master control system an instruction of prompting the user to charge the smart water dispenser if the power is lower than a second preset value; wherein the master control system monitors the water volume detection module and the power monitoring module.

Alternatively, the cup detection module includes a pressure sensor arranged under the outlet, and the master control system identifies whether a cup is placed under the outlet according to a pressure change of the pressure sensor.

Alternatively, the cup detection module includes a camera for photographing from under the outlet to generate image information, and the master control system performs feature extraction and matching on the image information to identify whether a cup is placed under the outlet.

Alternatively, the smart water dispenser further includes a cup height detection module for detecting a height of the cup under the outlet when the cup detection module detects the cup.

Alternatively, the cup height detection module includes a camera and a scale which are arranged respectively at left and right sides to the outlet.

Alternatively, the smart water dispenser further includes a remote controller for selecting and transmitting the user command to the command receiver.

Alternatively, the smart water dispenser further includes a water treatment module, for heating or cooling the water stored in the tank of the smart water dispenser.

Alternatively, the laser range finder measures a distance H between a bottom of the cup and the laser range finder, and measures a distance d between a water surface of water in the cup and the laser range finder in real time when the water is being added to the cup; when $d+h-r=H$, the electronically controlled switch is turned off, where r is an overflow prevention value, and h is a height of the cup.

The present disclosure further provides a control method of a smart water dispenser, including: turning on an electronically controlled switch to start adding water to a cup under the outlet in response that the cup is detected; detecting a water level of water in the cup when water is added to the cup; and turning off the electronically controlled switch to stop adding the water according to the detected water level.

Alternatively, said turning off the electronically controlled switch to stop adding the water according to the detected water level includes: measuring a distance H between a bottom of the cup and a laser range finder by the laser range finder, and measuring a distance d between a water surface of water in the cup and the laser range finder in real time when the water is being added to the cup; and turning off the electronically controlled switch to stop adding the water when $d+h-r=H$, where r is an overflow prevention value, and h is a height of the cup.

Alternatively, said turning on the electronically controlled switch to start adding water to the cup in response to that the cup under the outlet is detected includes: turning on the electronically controlled switch after the cup has been detected for a preset delay time.

Alternatively, the control method of the smart water dispenser further includes: when a user command with information on a water added volume is received, turning on the electronically controlled switch, calculating a water discharged volume of the outlet, and turning off the electronically controlled switch when the water discharged volume is equal to the water added volume.

Alternatively, the control method of the smart water dispenser further includes: receiving user commands and storing the user commands after priorities of the user commands to be executed are determined; and executing the user commands in an order in which the user commands are stored.

Alternatively, the control method of the smart water dispenser further includes: stopping the smart water dispenser at a preset location, if all the stored user commands have been executed; and determining a target location and a planned target route according to the current user command so as to move the smart water dispenser to the target location according to the planned target route, if there is a user command that is not executed.

Alternatively, said determining the priorities of the user commands to be executed includes one of: determining the priorities of the user commands according to an order in which the user commands are received; or determining the priorities of the user commands according to distances between locations from where the user commands are transmitted and the smart water dispenser; or calculating the priorities of the user commands by a preset formula which is set based on the order in which the user commands are received and on the distances between the locations of transmitting the user commands and the smart water dispenser.

Alternatively, the user command is selected by app software for controlling the smart water dispenser which is downloaded within a mobile terminal.

Additional features and advantages of the present disclosure will be set forth in the specification that follows, and in part will be apparent from the specification, or may be learned by implementation of the specification. The objectives and other advantages of the present disclosure may be realized and attained by structures particularly indicated in the specification, claims as well as the accompany drawings.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings are used to provide further understanding of the technical solutions of the present disclosure, and constitute a part of the specification, which are used to explain the technical solutions of the present disclosure in conjunction with the embodiments of the present disclosure, and are not intended to limit the technical solutions of the present disclosure.

DETAILED DESCRIPTION

To make the object, technical solutions, and advantages of the present disclosure clearer, the embodiments of the present disclosure will be described in detail with reference to the accompanying drawings. It should be noted that the embodiments of the present disclosure and features in the embodiments may be combined with each other arbitrarily in a case of no conflict.

In the following description, numerous specific details are set forth to facilitate a full understanding of the present disclosure. However, other implementations different from those described herein may also be employed herein. Thus, the protection scope of the present disclosure is not limited by the particular embodiments disclosed below.

Hereinafter, a smart water dispenser and a control method thereof according to some embodiments of the present disclosure will be described with reference to the accompanying drawings.

Traditional household water dispensers have low intelligence. When a user needs to drink water, he needs to go to the location of the water dispenser, place a cup and open a switch to pick up water, which process has a lower degree of automation and is inconvenient to be used.

The present disclosure discloses a smart water dispenser. After the user places the cup, the smart water dispenser automatically detects the cup, and realizes functions of automatic start and stop of adding outlet, automatic detection of whether the cup is filled, and the like, thereby achieving a high degree of automation of the smart water dispenser.

Figure 1:
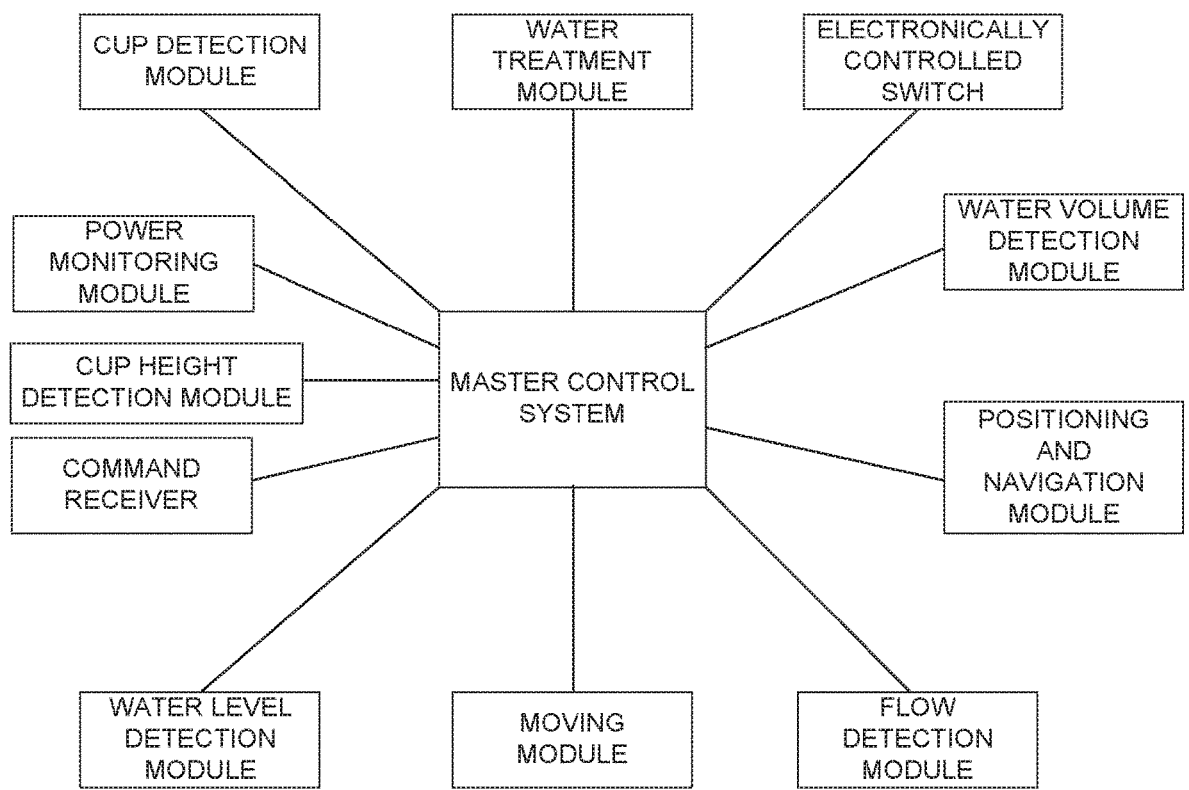
FIG. 1 is a schematic structure diagram of a smart water dispenser according to an embodiment of the present disclosure.

As shown in FIG. 1, the smart water dispenser according to an embodiment of the present disclosure includes: a command receiver for receiving and storing user commands and determining priorities of the user commands to be executed; a moving module for moving the smart water dispenser; a positioning and navigation module for determining a target location and a planned target route according to a user command, and controlling the moving module to move the smart water dispenser to a target location according to the planned target route; a water treatment module for heating or cooling water stored in a tank of the smart water dispenser; an electronically controlled switch for starting adding water to a cup when it is turned on, and stopping adding water when it is turned off; a cup detection module for detecting a cup placed under an outlet of the smart water dispenser; a cup height detection module for detecting a height of the cup under the outlet; a water level detection module for detecting a water level of water in the cup when the water is being added to the cup under the outlet; a flow detection module for calculating a water discharged volume of the outlet, and issuing to a master control system an instruction of turning off the electronically controlled switch if the water discharged volume reaches a predetermined value; and the master control system electronically connected to the command receiver, the moving module, the positioning and navigation module, the water treatment module, the electronically controlled switch, the cup detection module, the water level detection module and the flow detection module, for controlling the positioning and navigation module, the moving module, the water treatment module, the electronically controlled switch, the cup detection module, the water level detection module and the flow detection module according to the user command.

For the smart water dispenser according to the embodiment of the present disclosure, the user only needs to issue a user command, and the smart water dispenser, under the control of the master control system, automatically determines and moves to a target position by the moving module. After the user places the cup under the outlet, the cup detection module may automatically detect the cup, the water level detection module and the flow detection module implement automatic start and stop of adding water in cooperation with the electronically controlled switch, so that the cup is fully filled with water or water of a water added volume as required by the user is added to the water cap, so as to achieve a high degree of automation.

Alternatively, the smart water dispenser further includes: a water volume detection module for detecting a volume of water stored in the tank, and issuing to the master control system an instruction of prompting the user to add water to the tank if the volume of water is lower than a first preset value, facilitating the user to add the water to the tank in time to avoid dry burning; and a power monitoring module for monitoring a remaining power of the smart water dispenser, and issuing to the master control system an instruction of prompting the user to charge the smart water dispenser if the power is lower than a second preset value, guaranteeing that the smart water dispenser may be charged in time to extend a battery life of the smart water dispenser.

In a first particular embodiment of the present disclosure, the cup detection module includes a pressure sensor arranged under the outlet, and the master control system identifies whether a cup is placed under the outlet according to a pressure change of the pressure sensor. When the pressure detected by the pressure sensor increases, it is determined that a cup is placed, and when the pressure is resumed to an initial state, it is determined that no cup is placed.

In a second particular embodiment of the present disclosure, the cup detection module includes a camera for photographing from under the outlet to generate image information, and the master control system performs feature extraction and matching on the image information to identify whether a cup is placed under the outlet. This may also achieve the purpose of the present disclosure, and does not deviate from the design idea of the present disclosure. It is not described here any further and should fall within the protection scope of the present disclosure.

Alternatively, the water level detection module includes a laser range finder arranged at the outlet. The laser range finder measures a distance H between a bottom of the cup and the laser range finder, and measures a distance d between a water surface of water in the cup and the laser range finder in real time when the water is being added to the cup; when d+h−r=H, the electronically controlled switch is turned off, where r is an overflow prevention value, and h is a height of the cup.

Alternatively, the water level detection module includes a water level monitoring sensor and a wireless communication device arranged on the cup. The water level monitoring sensor is electrically connected to the master control system through the wireless communication device, and transmits information on the water level of water in the cup detected by the water level monitoring sensor to the master control system through the wireless communication device. As such, the master system controls the turn-on and turn-off of the electronically controlled switch, so as to fill the cup with water.

Alternatively, the cup height detection module comprises a camera and a scale which are arranged respectively at left and right sides to the outlet. The camera photographs the cup placed under the outlet, and the master control system determines the height of the cup by the scale.

Further, the smart water dispenser further includes a remote controller for selecting and transmitting the user command to the command receiver to complete actions of the smart water dispenser moving automatically and filling water to the cup placed under the outlet.

The electronically controlled switch may be an electromagnetic valve.

Figure 2:
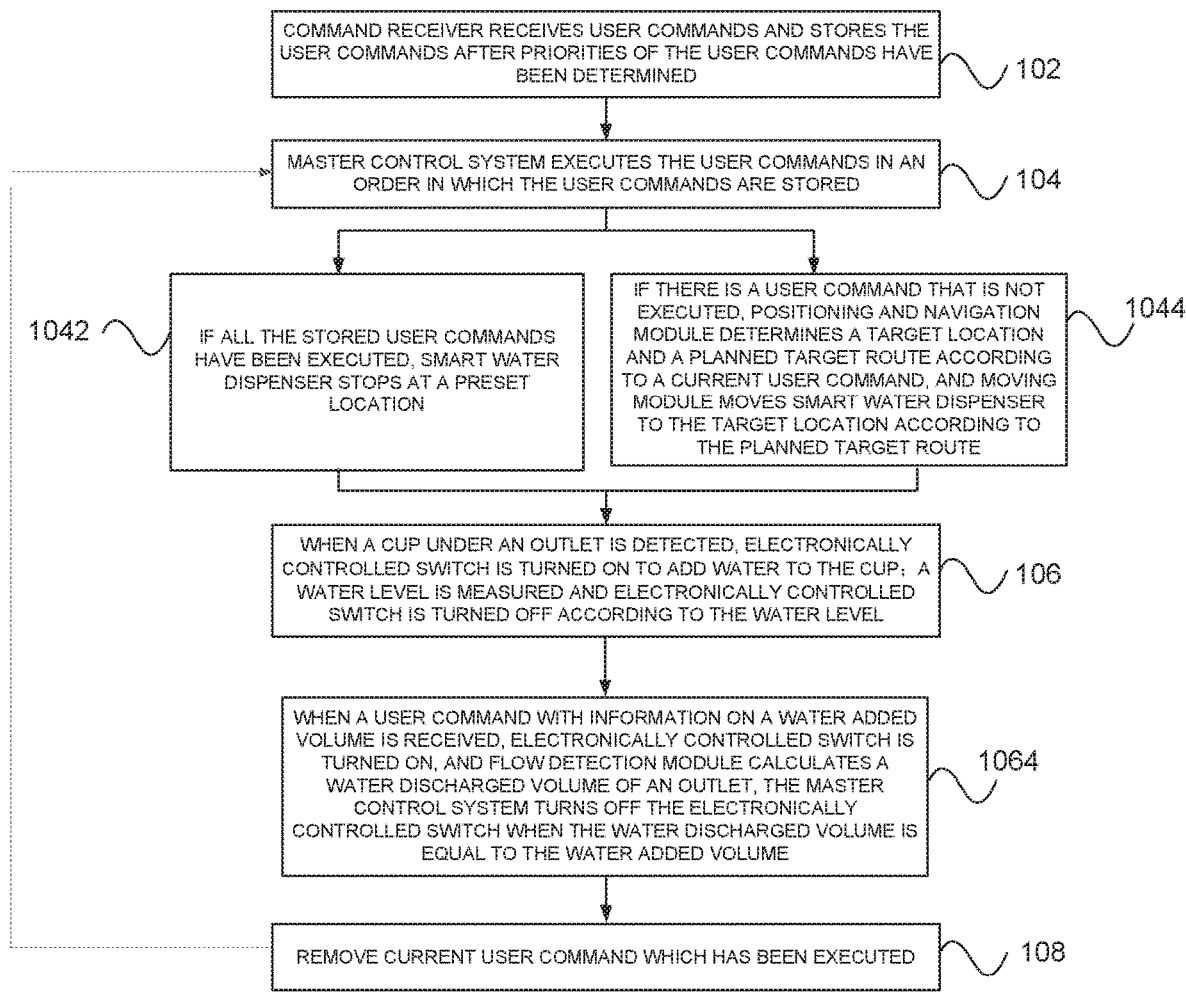
FIG. 2 is a flowchart of a control method of a smart water dispenser according to an embodiment of the present disclosure.

As shown in FIG. 2, a control method of a smart water dispenser according to an embodiment of the present disclosure includes: Step 102, in which the command receiver receives user commands and stores the user commands after the priorities of the user commands to be executed are determined (e.g., forming a command queue); Step 104, in which the master control system executes the user commands in an order in which the user commands are stored, which further includes: Step 1042, in which the smart water dispenser stops at a preset location (e.g., the initial location), if all the stored user commands have been executed; and Step 1044, in which the positioning and navigation module determines a target location and a planned target route according to the current user command, and the moving module moves the smart water dispenser to the target location according to the planned target route, if there is a user command that is not executed; Step 106, in which when it is detected that there is a cup under the outlet, the electronically controlled switch is turned on to add water to the cup; a water level of water in the cup is detected; and the electronically controlled switch is controlled to be turned off to stop adding the water according to the detected water level; Step 108, in which the current user command which has been executed is removed, and Steps 104-108 are repeated for continuously executing the next user command.

According to the control method of the smart water dispenser according to the present disclosure, the user only needs to issue a user command, and a plurality of user commands may be issued at one time; the command receiver may automatically determine the priorities of the user commands to be executed; the smart water dispenser automatically determines and moves to the target position according to the currently executed user command; after the user places the cup under the outlet, the cup detection module may automatically detect the cup, the water level detection module and the flow detection module implement automatic start and stop of adding water in cooperation with the electronically controlled switch, so that the cup is fully filled with water or water of a water added volume as required by the user is added to the water cap, so as to achieve the high degree of automation.

Alternatively in Step 106, the electronically controlled switch is turned on after the cup placed by the user under the outlet has been detected for a preset delay time (e.g., 1~3 s), so as to ensure that the user's hand is moved away, preventing hot water from splashing out to burn the user's finger when water is being added to the cup.

Figure 3:
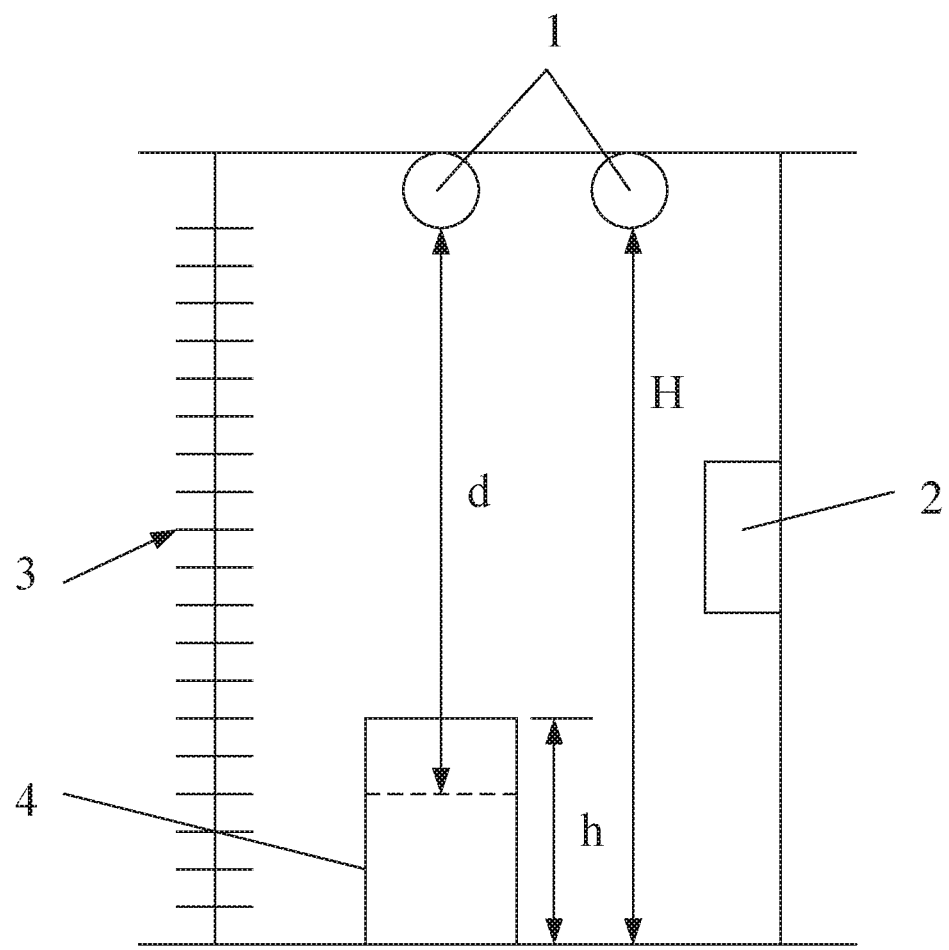
FIG. 3 is a schematic diagram of detecting a cup.

Alternatively in Step 106, the distance H between a bottom of the cup and the laser range finder 1 is measured by the laser range finder 1, and the distance d between the water surface of water in the cup 4 and the laser range finder 1 is measured in real time when the water is being added to the cup 4. When d+h−r=H, the electronically controlled switch is turned off to stop adding water, where r is an overflow prevention value (e.g., 5 mm-25 mm), and h is the height of the cup. The height h of the cup may be calculated by the camera 2 and the scale marks of the scale 3 aside the outlet. The preset value at this time corresponds to filling the cup fully with water (as shown in FIG. 3).

Alternatively, the control method of the smart water dispenser further includes Step 1064, in which when a user command with information on a water added volume is received, the electronically controlled switch is turned on, a water discharged volume of the outlet is calculated, and the electronically controlled switch is turned off when the water discharged volume is equal to the water added volume.

Alternatively in Step 102, said determining the priorities of the user commands to be executed may be: determining the priorities of the user commands according to the order in which the user commands are received. The earlier the user command is received, the higher the priority thereof is.

Alternatively in Step 102, said determining the priorities of the user commands to be executed may be: determining the priorities of the user commands according to distances between a location (i.e., the target location or the user's location) from where the user commands are transmitted and a location of the smart water dispenser. The shorter the distance is, the higher the priority thereof is.

Alternatively in Step 102, said determining the priorities of the user commands to be executed may be: calculating the priorities of the user commands by a preset formula which is set based on the order in which the user commands are received and on the distances between the location from where the user commands are transmitted and the location of the smart water dispenser. The preset formula may be set as actual requirements, or may be a correspondence table stored in the master control system etc., all of which may achieve the purpose of the present disclosure, and description thereof will be omitted here.

Preferably, the user command is selected by app software for controlling the smart water dispenser, which is downloaded within a mobile terminal and is transmitted to the command receiver. The mobile terminal may be a mobile phone, a tablet, etc. Thus, a dedicated remote controller may be omitted, which may effectively reduce manufacturing costs of the smart water dispenser.

In view of the foregoing, the present disclosure provides a smart water dispenser. The user only needs to issue a user command, and the smart water dispenser, under the control of the master control system, automatically determines and moves to a target position by the moving module. After the user places the cup under the outlet, the cup detection module may automatically detect the cup, the water level detection module and the flow detection module implement automatic start and stop of adding water in cooperation with the electronically controlled switch, so that the cup is fully filled with water or water of the water added volume as required by the user is added to the water cap, so as to achieve the high degree of automation.

In the description herein, the terms "mounted", "coupled", "connected", "fixed" etc. should be broadly understood. For example, "connected" may be a fixed connection, a detachable connection, or an integral connection; and may be directly connected or indirectly connected through an intermediary. For those skilled in the art, specific meanings of the above terms herein may be understood according to specific situations.

In the description of the present specification, descriptions of the terms "one embodiment", "some embodiments", "particular embodiments" and the like are intended to mean that specific features, structures, materials, or characteristics described in connection with the embodiments or examples are included in at least one embodiment or example of the present disclosure. In the specification, the schematic representations of the above terms do not necessarily refer to the same embodiment or example. Moreover, the particular features, structures, materials, or characteristics described may be combined in any suitable manner in one or more embodiments or examples.

Although the embodiments disclosed herein are as described above, the contents described are merely implementations for facilitating understanding of the present document and are not intended to limit the present disclosure. Any person skilled in the art to which the present disclosure belongs may make any modifications and changes in forms and details of implementation without departing from the spirit and scope disclosed herein. However, the protection scope of the present disclosure is defined by the appended claims.

What is claimed is:

1. A control method of a smart water dispenser, comprising:
    detecting whether there is a cup under an outlet;
    turning on an electronically controlled switch to start adding water to the cup in response to that the cup under the outlet is detected;
    detecting a water level of water in the cup when water is added to the cup;
    turning off the electronically controlled switch to stop adding the water according to the detected water level, receiving user commands,
    determining priorities of the user commands by one or more of:
        determining priorities of the user commands according to an order in which the user commands are received; or
        determining priorities of the user commands according to distances between locations from where the user commands are transmitted and the smart water dispenser; or
        calculating the priorities of the user commands by a preset formula which is set based on the order in which the user commands are received and on the distances between the locations from where the user commands are transmitted and the smart water dispenser;
    storing the user commands according to the priorities of the user commands to be executed; and
    executing the user commands in an order in which the user commands are stored.

2. The control method of the smart water dispenser according to claim 1, wherein said turning off the electronically controlled switch to stop adding the water according to the detected water level comprises:
    measuring a distance H between a bottom of the cup and a laser range finder by the laser range finder, and measuring a distance d between a water surface of water in the cup and the laser range finder in real time when the water is being added to the cup; and
    turning off the electronically controlled switch to stop adding the water when d+h−r=H, where r is an overflow prevention value, and h is a height of the cup.

3. The control method of the smart water dispenser according to claim 1, wherein said turning on the electronically controlled switch to start adding water to the cup in response to that the cup under the outlet is detected comprises:
    turning on the electronically controlled switch after the cup has been detected for a preset delay time.

4. The control method of the smart water dispenser according to claim 1, further comprising:

when a user command with information on a water added volume is received, turning on the electronically controlled switch, calculating a water discharged volume of the outlet, and turning off the electronically controlled switch when the water discharged volume is equal to the water added volume.

5. The control method of the smart water dispenser according to claim 1, further comprising:

determining whether there is a user command to be executed:

if there is no user command to be executed, stopping the smart water dispenser at a preset location; and if there is a user command to be executed, determining a target location and a planned target route according to the user command so as to move the smart water dispenser to the target location according to the planned target route.

6. The control method of the smart water dispenser according to claim 1, wherein the user command is selected by app software for controlling the smart water dispenser which is downloaded within a mobile terminal.

\* \* \* \* \*